United States Patent
Le Bris et al.

(10) Patent No.: US 9,199,275 B2
(45) Date of Patent: Dec. 1, 2015

(54) COOKING ITEM COMPRISING A NON STICK COATING WITH IMPROVED PROPERTIES OF ADHESION TO THE SUBSTRATE

(71) Applicant: SEB SA, Ecully (FR)

(72) Inventors: Stéphanie Le Bris, Challes les Eaux (FR); Aurélien Dubanchet, Gresy sur Aix (FR); Jean-Luc Perillon, Saint Paul Trois Chateaux (FR)

(73) Assignee: SEB SA, Ecully (FR)

(*) Notice: Subject to any disclaimer, the term of this patent is extended or adjusted under 35 U.S.C. 154(b) by 83 days.

(21) Appl. No.: 13/760,304

(22) Filed: Feb. 6, 2013

(65) Prior Publication Data

US 2013/0149444 A1    Jun. 13, 2013

Related U.S. Application Data

(62) Division of application No. 13/000,888, filed as application No. PCT/FR2009/051981 on Oct. 16, 2009, now Pat. No. 8,372,496.

(30) Foreign Application Priority Data

Oct. 16, 2008   (FR) ...................... 08 57044

(51) Int. Cl.
*B05D 3/02* (2006.01)
*B05D 7/22* (2006.01)
(Continued)

(52) U.S. Cl.
CPC . *B05D 7/22* (2013.01); *A47J 36/02* (2013.01); *A47J 36/025* (2013.01); *B05D 5/08* (2013.01);
(Continued)

(58) Field of Classification Search
USPC ....................................... 427/376.2
See application file for complete search history.

(56) References Cited

U.S. PATENT DOCUMENTS 3,013,897 A    12/1961   Cupery et al.
3,108,170 A    10/1963   Murphy
(Continued)

FOREIGN PATENT DOCUMENTS

DE    7200907    8/1972
DE    2827461    1/1980
(Continued)

OTHER PUBLICATIONS

International Search Report and Written Opinion for PCT/FR2005/000775 dated Aug. 12, 2005.
(Continued)

*Primary Examiner* — Nathan Empie
(74) *Attorney, Agent, or Firm* — Patterson Thuente Pedersen, P.A.

(57) ABSTRACT

A cooking item including a vitreous coating with improved impact-resistance properties, and a method for manufacturing such an item. The method for manufacturing includes optionally treating a concave internal side of a substrate having the end shape of the cooking item, the concave internal side being arranged on the side of the food to be introduced in said item, and a convex exterior side to be arranged on the heat source side, so as to obtain a treated internal side adapted to cause a hard base layer to adhere to the substrate, The method further includes preparing an adhering hard base layer on said internal side of the substrate, be it treated beforehand or not, and preparing a non-stick coating on the hard base layer.

9 Claims, 5 Drawing Sheets

(51) Int. Cl.
   *A47J 36/02* (2006.01)
   *B05D 5/08* (2006.01)
   *C09D 183/04* (2006.01)

(52) U.S. Cl.
   CPC .......... *C09D 183/04* (2013.01); *Y10T 428/131* (2015.01); *Y10T 428/24413* (2015.01); *Y10T 428/24421* (2015.01)

(56) References Cited

U.S. PATENT DOCUMENTS

| | | | |
|---|---|---|---|
| 3,473,952 | A | 10/1969 | McFadden |
| 3,534,148 | A | 10/1970 | Bange |
| 3,663,793 | A | 5/1972 | Petro et al. |
| 3,934,748 | A | 1/1976 | Racz |
| 4,123,401 | A | 10/1978 | Berghmans et al. |
| 4,768,427 | A | 9/1988 | Cheng |
| 4,959,256 | A | 9/1990 | Piera |
| 5,037,675 | A * | 8/1991 | Kishi et al. .......... 427/258 |
| 5,275,655 | A | 1/1994 | Grunau et al. |
| 5,536,583 | A | 7/1996 | Roberts et al. |
| 6,162,498 | A | 12/2000 | Mennig et al. |
| 6,238,847 | B1 | 5/2001 | Axtell, III et al. |
| 7,241,131 | B1 | 7/2007 | Booth et al. |
| 8,227,072 | B2 | 7/2012 | Le Bris et al. |
| 8,372,496 | B2 | 2/2013 | Le Bris et al. |
| 2002/0045359 | A1 | 4/2002 | Todd |
| 2002/0179329 | A1 | 12/2002 | Fukuoka et al. |
| 2003/0059600 | A1 * | 3/2003 | Gazo et al. .......... 428/328 |
| 2003/0138661 | A1 | 7/2003 | Souchard et al. |
| 2005/0036809 | A1 | 2/2005 | Fukita et al. |
| 2006/0251837 | A1 * | 11/2006 | Cnossen et al. .......... 428/35.7 |
| 2007/0218297 | A1 | 9/2007 | Jeon et al. |
| 2007/0231563 | A1 | 10/2007 | Adams et al. |
| 2008/0032122 | A1 | 2/2008 | Berrux et al. |
| 2008/0237241 | A1 | 10/2008 | Buffard et al. |
| 2008/0290088 | A1 | 11/2008 | Leboeuf et al. |
| 2009/0004434 | A1 | 1/2009 | Parent et al. |
| 2009/0099287 | A1 | 4/2009 | Gier et al. |
| 2010/0003537 | A1 | 1/2010 | Akarsu et al. |
| 2011/0174826 | A1 | 7/2011 | Le Bris et al. |
| 2011/0180546 | A1 | 7/2011 | Le Bris et al. |
| 2011/0192850 | A1 | 8/2011 | Le Bris et al. |
| 2011/0198358 | A1 | 8/2011 | Parent et al. |
| 2011/0308989 | A1 | 12/2011 | Berrux et al. |
| 2012/0018433 | A1 | 1/2012 | Le Bris et al. |

FOREIGN PATENT DOCUMENTS

| | | |
|---|---|---|
| DE | 10059487 | 6/2002 |
| DE | 20319024 | 3/2004 |
| EP | 0285161 | 10/1988 |
| EP | 0323349 | 7/1989 |
| EP | 0515705 | 12/1992 |
| EP | 0580557 | 1/1994 |
| EP | 1835002 | 9/2007 |
| FR | 1536889 | 8/1968 |
| FR | 2275103 | 1/1976 |
| FR | 2576038 | 7/1986 |
| FR | 2622600 | 5/1989 |
| FR | 2625494 | 7/1989 |
| FR | 2882240 | 8/2006 |
| GB | 926001 | 5/1963 |
| GB | 926002 | 5/1963 |
| GB | 1159390 | 7/1969 |
| GB | 2169282 | 7/1986 |
| JP | 2-279574 | 11/1990 |
| WO | WO99/16625 | 4/1999 |
| WO | WO00/22395 | 4/2000 |
| WO | WO00/56537 | 9/2000 |
| WO | WO2004/049761 | 6/2004 |

OTHER PUBLICATIONS

International Search Report for International Application No. PCT/FR2005/001365 dated Nov. 22, 2005.
International Search Report for International Application No. PCT/FR2006/002313 dated Feb. 8, 2007.
International Search Report for International Application No. PCT/IB2009/007973 dated Sep. 9, 2010.
Muller et al., "Enamelled Article especially for Heating Food, has later of Aluminum to Enhance Adhesion of Enamel Layer to Ferromagnetic Supporting Surface", Aug. 25, 2006.
Randau et al., "Enamels and Enamelling", 1900. Scott Greenwood and Company. pp. 142-144.
Application and File History for U.S. Appl. No. 13/142,137, filed Sep. 9, 2011, inventors Berrux et al.
Application and File History of U.S. Appl. No. 12/997,569, filed Apr. 11, 2011, inventors Le Bris et al.
Application and File History of U.S. Appl. No. 12/163,289, filed Jun. 27, 2008, inventors Parent et al.
Application and File History of U.S. Appl. No. 12/997,574, filed Apr. 4, 2011, inventors Parent et al.
Application and File History of U.S. Appl. No. 13/000,888, filed Apr. 4, 2011, inventors Le Bris et al.
Application and File History of U.S. Appl. No. 13/000,906, filed Apr. 25, 2011, inventors Le Bris et al.

* cited by examiner

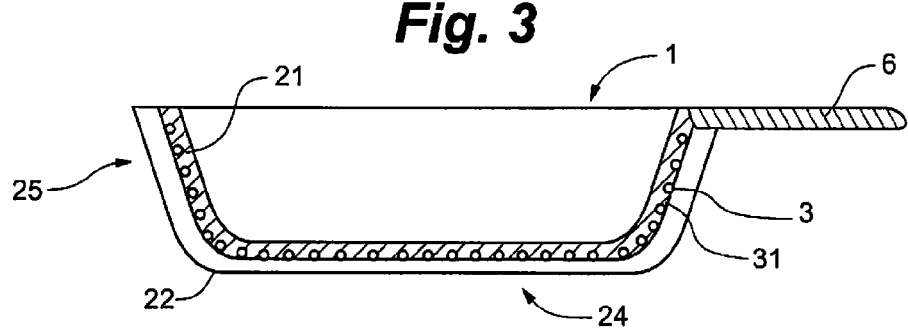
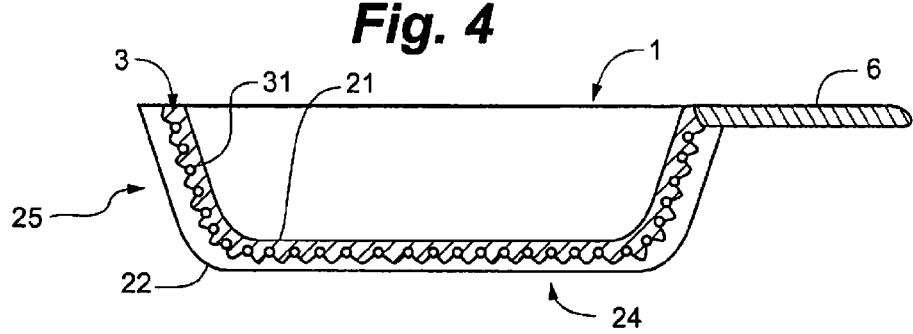

COOKING ITEM COMPRISING A NON STICK COATING WITH IMPROVED PROPERTIES OF ADHESION TO THE SUBSTRATE

RELATED APPLICATIONS

This application is a division of application Ser. No. 13/000,888 filed Apr. 4, 2011, which in turn is a National Phase entry of PCT Application No. PCT/FR2009/051981, filed Oct. 16, 2009, which claims priority from French Application No. 0857044, filed Oct. 16, 2008, each of which is hereby fully incorporated by reference.

TECHNICAL FIELD

The present invention generally relates to cooking items comprising a non stick coating, and more particularly, it relates to cooking items comprising a vitreous, non stick coating having improved properties of adhesion to the substrate. The present invention also relates to a manufacturing method for the same.

BACKGROUND ART

As used herein, the meaning of vitreous coating is a coating having a glass or enamel appearance which may be either organo-mineral, or totally mineral.

As used herein, the meaning of organo-mineral vitreous is a coating composed of a sol-gel type material (that is, obtained through a sol-gel treatment), whose network is substantially inorganic, yet including an organic groups, particularly because of the curing temperature of the coating and the precursors used.

As used herein, the meaning of entirely mineral coating is a coating composed of an entirely inorganic material, free from all organic groups. Such a coating may also be obtained through a sol-gel process with a curing temperature of at least 400° C., or from tetraethoxisilane (TEOS) precursors with a curing temperature which may be less than 400° C.

In the field of vitreous, non stick coatings, intended for use in culinary articles, sol-gel coatings, particularly those obtained from silica (silane) based, or alumina based (aluminate) metal alkoxides.

These coatings are currently experiencing wide development in the field of cooking items, in that they make it possible to obtain colored coatings with a particularly good resistance to temperature and scratches.

However, such coatings have limited adhesion on metal substrates, in particular, aluminum substrates, stainless steel substrates or cast iron substrates.

To alleviate these drawbacks, it has been known by the skilled person to prepare the substrate surface through chemical treatment (for example, a chemical etching treatment) or mechanical treatment (for example a brushing or sand blasting treatment), or even a combination thereof.

Nevertheless, even when such treatments are carried out, the adhesion of the non stick coating to the substrate remains limited, particularly when the non stick coating is subjected to a mechanical deformation such a an impact or drilling, for example, in order to fix a rivet or an assembling stud.

Thus, when cooking items, whose bottom has an internal side coated with a sol-gel type, non stick coating, are subjected violent shocks, a mark is observed under the impact, accompanied with cracks propagating radially even though the internal side of the bottom has been brushed or sand blasted beforehand.

Thus, the manufacturing of such cooking items should be carried out very cautiously causing high scrap rates and low manufacturing throughputs.

To alleviate the problems of limited adhesion to the substrate experienced with sol-gel type, vitreous coatings, the applicant has surprisingly discovered that reinforcing the internal side of the cooking item bottom with a discontinuous, hard enameled base makes it possible to significantly improve the adhesion of the non stick coating on metallic substrates (in particular, aluminum or aluminum alloy substrates), notably exhibiting an enhanced impact resistance of the non stick coating.

As used herein, what is meant by impact resistance is the ability of the coating to resist a violent shock.

By contrast, after a violent shock or impact) a coating having a low impact resistance exhibits, under the impact, a mark accompanied by radially propagating cracks. The adhesion in this area becomes so weak that the mere fact of scraping with a nail removes a portion of the coating whereof the size is actually higher than that of the impact itself.

More particularly, the object of the present invention is a cooking item comprising a metallic substrate having a concave internal side to be arranged on the side of the food, and a convex exterior side to be arranged on the heat source side, said internal side being successively coated from the substrate with a hard base layer and a non stick coating covering said hard base layer, wherein:

the hard base layer is a discontinuous enamel layer in the form of a superficial dispersion of enamel drops homogeneously distributed over the internal side of said item, the internal side being covered with a coverage ratio between 40% and 80%, a surface density between 300 drops/mm$^2$ and 2000 drops/mm$^2$ and a drop size between 2 μm and 50 μm, and said anti stick coating is a PTFE-free, vitreous type coating shaped as a continuous film having a thickness of at least 10 μm and composed of a sol-gel material comprising a matrix of at least a metal polyalkoxilate and at least 5% by weight of the coating total weight of at least one metal oxide dispersed in said matrix.

As used herein, what is meant by enamel is enamel having a softening point lower than the melting temperature of the substrate.

For instance, in the case of an aluminum or aluminum alloy substrate with a melting temperature of about 600° C., the softening point of enamel is lower than this temperature.

As used herein, what is meant by superficial dispersion of enamel drops is a discontinuous enamel layer in a divided state over a substrate (in this case, the substrate of the cooking item), such that the roughness of this layer is produced by the dispersed enamel drops.

As used herein, what is meant by coverage ratio of the substrate is the ratio, expressed in percent, of the substrate area actually covered by the superficial dispersion of enamel drops by the total area of the substrate which may be covered by the hard base layer.

As used herein, what is meant by surface roughness Ra, is the arithmetic mean deviation between the grooves and peaks of the surface with respect to the median (or mean) line, this deviation being assessed based on ISO 4287 standard.

It is observed that the presence of such a discontinuous enameled hard base layer arranged between the substrate and the sol-gel type non stick coating yields to a significant improvement of the impact resistance of the non stick coating.

With more particular regard to the enameled and discontinuous hard base layer, it exhibits a surface roughness Ra which actually depends on that of the substrate internal side whereon it is deposited.

Thus, in the case of a substrate whereof the internal side has been sand blasted prior to the deposition of the hard base layer and which exhibits a surface roughness Ra between 3 and 8 µm, the enameled and discontinuous hard base layer has then a surface roughness Ra comprised between 9 and 12 µm.

On the contrary, in the case of a substrate whereof internal side is smooth, the enameled and discontinuous hard base layer by which it is covered thus exhibits a surface roughness Ra comprised between 2 and 4 µm.

Advantageously, the enameled and discontinuous hard base layer has a hardness higher than or equal to that of the metal and/or metal alloy composing the substrate.

Now relating to the coating covering the structured internal side, and particularly, the sol-gel material composing this coating, this material matrix may advantageously comprise the condensation products of metal polyalkoxilates, for example, one or more polyalkoxisilanes, an aluminate, a titanate, a zirconate, a vandate, a borate, or mixtures thereof.

Preferably, the coating matrix according to the invention comprises a polyalkoxisilane and/or an aluminate such as to compose a mixed matrix.

In an alternative embodiment of the invention, the coating matrix according to the invention is grafted through one or several organic groups selected from $C_1$-$C_4$ alkyl groups and phenyl groups. These groups are required for improving the hydrophobic capability of the coating. In view to obtaining a better thermal stability for the coating, shorter chains are preferred in the frame of the present invention.

Preferably, the coating matrix according to the invention is grafted through one or more methyl groups, which enhance the hydrophobic feature of the coating without interfering with the formation of the inorganic network.

Besides the matrix of at least one metal polyalcoxylate, the vitreous coating according to an embodiment of the invention, comprises at least 5% by weight, and preferably from 5% to 30% by weight of the total weight of the coating, of at least one metal oxide, which is preferably finely dispersed in the matrix. This metal oxide is of a generally colloidal shape in the form of aggregates, whose size is lower than the micron, or even from 300 to 400 nm.

As colloidal metal oxide for use in the non stick coating according to the invention, silica, alumina, cerium oxide, zinc oxide, vanadium oxide and zirconium oxide may be cited. Preferred colloidal metal oxides are silica and alumina.

The presence of a metal oxide in the coating matrix an embodiment of the invention makes it possible to obtain a film with sufficient thickness, that is, a thickness of at least 10 µm. if the coating thickness is lower than 10 µm, the mechanical strength of the formed film would not be sufficient.

Preferably, the film has a thickness comprised between 10 and 80 µm, and more preferably between 30 and 50 µm such that the film layer thus formed is continuous, consistent and sufficient to absorb the substrate roughness.

Advantageously, the sol-gel material composing the non stick coating may further comprise at least silicone oil in order to enhance the hydrophobic nature of the coating surface, and particularly following a thermal shock such as flame exposure type.

In this regard, the metal polyalkoxylate has hydrophobic groups which are destroyed at high temperature during the passage over a flame. Nevertheless, this disappearance of the hydrophobic nature is temporary, as it is compensated for by the silicone oil trapped in the polyalkoxylate and whereof surface migration in infinitesimal amounts promotes the progressive rebuild of hydrophobic groups on the film surface.

With a coating according to an embodiment of the invention comprising at least 0.1% by weight of silicone oil, it is observed that the rebuild of the hydrophobic nature is sufficient at the time of a new cooking. In this regard, the value of the static contact angle θ of a water drop deposited on the coating of the invention is of about 20° after a flame exposure type thermal shock. This static contact angle value goes up to at least 75° after a process of rebuilding the hydrophobic features of reheating the room temperature at 200° C., for a period of at least 5 minutes, that is, when the item is ready for a new cooking.

Preferably, the silicone oil represents 0.1 to 6% by weight and more preferably 0.3 to 5% by weight of the total weight of the coating (dry state). Less than 0.1% by weight of silicone oil, the rebuild of hydrophobic groups that have disappeared during flame passage (600° C.) is lower, the obtained angle being lower than 62° C.

More preferably, the sol-gel material of the coating according to an embodiment of the invention comprises 0.5 to 2% by weight of silicone oil with respect to the total weight of the dry coating. In this case, the initial static contact angle θ of a water drop deposited on such a coating is of 95° C. Following flame passage type a thermal shock, this coating exhibits an angle of 20° C. Following a rebuild process comprising at least a step of reheating the room temperature to 200° C. over a period of at least 5 minutes, the static contact angle becomes higher than 75° C. when the item is ready for a new cooking.

The coating according to an embodiment of the invention may comprise a silicone oil or a mixture of silicone oils.

As silicone oils that may be used in the coating according to an embodiment of the invention, may be particularly cited phenyl silicones, methyl-phenyl silicones and methyl silicones.

If the coating according to an embodiment of the invention is to be in contact with food items, food grade silicone oil should preferably be selected, and in particular, one selected from food grade methyl-phenyl silicones and methyl silicones.

As methyl-phenyl silicone oils, may be particularly cited non food oils from WACKER under trade name WACKER SILICONOL AP150 and from DOW CORNING under trade name DOW CORNING 550 fluid, as well as food oils from WACKER ARM. As methyl silicone oils, oil from RHODIA under trade name RHODIA 47 V350, oil WACKER 200 fluid from WACKER or TEGO ZV 9207 oil from TEGO, may be cited, which are food-grade methylsilicone oils.

Preferably, a silicone oil selected from the aforementioned oils is used, which oil has a molecular weight of at least 1000 g/mol, which is non reactive and exhibits a viscosity between 20 et 2000 mPa·s.

Advantageously, the sol-gel material of the coating according to the invention may further comprise fillers for enhancing the mechanical features of the formed coating, and/or pigments, to render the coating colored. Moreover, the presence of fillers and/or pigments has also an advantageous effect on the hardness of the film.

As fillers which may be used in the coating according to an embodiment of the invention, alumina, zirconium, mica, clay (such as montmorillonite, sepiolite, gypsite, kaolinite and laponite®) and zirconium phosphate may be cited.

As pigments which may be used in the coating according to an embodiment of the invention, titanium dioxide, copper-chromium-manganese mixed oxides, iron oxide, carbon black, pyralene red, aluminosilicates, metal flakes and particularly aluminum flakes, may be cited.

Preferably, the fillers and/or pigments are flake shaped, which advantageously improves the hardness of the non stick coating.

Preferably, the fillers and/or pigments are nanoscaled so as to improve their dispersion and their distribution in the coating, providing the coating a high performance consistency.

In an advantageous version of the cooking item according to an embodiment of the invention, the substrate is a hollow cap of a cooking item, having a bottom and a lateral wall rising from said bottom.

The substrate of the cooking item according to an embodiment of the invention is advantageously made from a material selected from metals, glass and ceramic.

Metal substrates, and preferably anodized or non anodized aluminum or aluminum alloy, stainless steel, cast iron, iron or copper substrates are recommended.

As aluminum alloys that may be used to make the substrate of the cooking item according to an embodiment of the invention, are particularly recommended low alloyed, enamelable aluminum alloys, and in particular:

- 99% aluminum-containing "pure" aluminums of series 1000, and for example, alloys 1050, 1100, 1200 and 1350,
- aluminum and manganese alloys of series 3000, and for example, alloys 3003, 3004, 3105 and 3005,
- aluminum and silicon alloys of series 4000,
- aluminum and magnesium alloys of series 5000, and for example alloys 5005, 5050 and 5052, and
- aluminum, silicon and magnesium alloys of series 6000, and for example, alloys 6053, 6060, 6063, 6101 and 6951, and
- aluminum, iron, silicon alloys of series 8000, and for example, alloy 8128.

Finally, embodiments of the present invention also relate to a method for manufacturing a cooking item, comprising the steps of:

a) a step of providing a substrate having the end shape of the cooking item with a concave internal side to be disposed on the side of the food to be introduced in said item, and a convex exterior side to be disposed on the heat source side;

b) optionally, a step of treating the internal side of the substrate, so as to obtain a treated internal side adapted to cause a hard base layer to adhere on the substrate;

c) a step of preparing an adhering hard base layer on the substrate internal side, be it treated beforehand or not;

d) a step of preparing a non stick coating on the hard base layer formed in step c); the method including:

step c) of preparing a discontinuous, enameled hard base layer comprising the following successive steps of:
- c1) preparing an aqueous slurry of enamel frit;
- c2) applying, through air spraying, the slurry on the substrate internal side with a pressure equal to or higher than 4 bars such that the amount of deposited slurry is comprised between 0.07 g/dm$^2$ and 0.2 g/dm$^2$; then
- c3) drying and/or curing said enamel layer so as to form a hard biscuit of enamel or a layer of cured enamel; and step d) of preparing the non stick coating on said enamel hard biscuit or said cured enamel layer comprising the following successive steps of:
- d1) preparing a sol-gel composition (A+B) comprising at least a colloidal metal oxide and at least a metal oxide type precursor;
- d2) applying over the entirety or over a portion of the enamel hard biscuit or said cured enamel layer at least a layer of the sol-gel composition (A+B) whose wet-basis thickness is at least of 20 μm; then
- d3) curing said sol-gel composition layer (A+B) so as to obtain a non stick vitreous coating whose thickness is at least of 10 μm.

Advantageously, the enamel frit has less than 50 ppm of cadmium and less than 50 ppm of lead, and comprising 30 to 40% by weight of silica and 15 to 30% by weight of titanium oxide, less than 10% by weight of vanadium oxide and less than 4% by weight of lithium oxide with respect to the total weight of the frit, and the aqueous slurry comprises at least 20% by weight of mineral fillers with respect to the total weight of the slurry.

With regard to the preparation of the hard base layer on the substrate internal side, according to embodiments of the present invention, no homogeneous compound whose post-curing structure is determined by its pre-curing, initial chemical composition is applied, by contrast to an electric-arc or plasma projection method. In this regard, in embodiments of the present invention, an aqueous slurry of enamel frit is applied and it is observed during drying and/or curing that a homogenization of the different fusible elements of the slurry, those arising from the enamel frit and those arising from the slurry formulation thereof, takes place. Thus, in the present invention, there is no one-for-one correspondence between the slurry composition and the structure of the enamel formed following the application and the curing of this slurry.

The method pursuant to embodiments of the present invention has the advantage of implementing an aqueous slurry of an enamel frit which does not contain any solvent and thus generates no VOC, and, in embodiments, the enamel frit used in the method according to the present invention contains almost no noxious matter such as lead or cadmium or hardly in the form of little traces (50 ppm at the most of a noxious element), such that the enamel thus formed conforms to the food legislation in terms of enamel frit formulation or in terms of slurry formulation.

According to an alternative embodiment of the method of the invention, during step c) of preparing a discontinuous, enameled hard base layer, the non cured enamel layer is merely dried at a temperature comprised between 120° C. and 200° C. to yield an enameled biscuit.

According to a second alternative embodiment of the method of the invention, during step c) of preparing a discontinuous, enameled hard base layer, the non cured enamel layer is subjected to curing at a temperature comprised between 500 and 580° C.

With regard to the preparation of the sol-gel type non stick coating, in embodiments, the sol-gel composition A+B is prepared as follows:

i) preparing an aqueous composition A comprising 5 to 30% by weight of the total weight of the aqueous composition A of at least a metal oxide, and 0 to 20% by weight of the total weight of composition A of a solvent comprising at least one alcohol; then ii) preparing a solution B comprising at least a metal alkoxide type precursor; then iii) mixing solution B of metal alkoxide with aqueous solution A so as to obtain a sol-gel composition (A+B) containing 40 to 75% by weight of the aqueous composition A to the total weight of the sol-gel composition (A+B), so that the amount of colloidal metal oxide represents 5 to 30% by weight of the sol-gel composition (A+B) on a dry basis.

With more particular regard to the preparation of the aqueous composition A, the introduction of at least 5% by weight of at least a metal oxide with respect to the total weight of composition A is required to form a film whose post-curing thickness is at least of 10 microns. If, on the contrary, the amount is higher than 30% by weight of the total weight of composition A, composition A is not stable.

The metal oxide of the aqueous composition A is as defined above. Preferably, it is a colloidal metal oxide selected from colloidal silica and/or colloidal alumina.

The presence of an alcohol-based solvent is optional, but has the advantage of improving the compatibility of aqueous composition A with metal alkoxide solution B.

Nevertheless, it is also possible not to use a solvent, yet, in this case, the number of possible polyalkoxylates is reduced to those having an excellent compatibility with water. It is possible to have an excess amount of solvent (higher than 20%), yet, this unnecessarily generates non environmental-friendly volatile organic compounds.

As a solvent, an oxygenated alcohol-based solvent or ether-alcohol is preferably used in aqueous composition A.

Aqueous composition A according to embodiments of the invention may also comprise, besides the colloidal metal oxide, and, if need be, the alcohol-based solvent, at least a silicone oil, which is preferably present in composition A in an amount of 0.05% to 3% by weight with respect to the total weight of the composition.

With an aqueous composition A comprising 0.5 to 2% by weight of silicone oil, a coating exhibiting hydrophobic features which may rebuild in the frame of a cooking use. Silicone oil of composition A is a food-grade silicone oil defined above.

Aqueous composition A in embodiments of the invention may further comprise fillers and/or pigments such as defined above.

Aqueous composition A in embodiments of the invention may further comprise pyrogenic silica, which is intended to adjust the viscosity of the sol-gel composition and/or the glossy effect of the dry coating.

With regard to the preparation of solution B, as a precursor is preferably used a metal alkoxide selected from the group consisting in:

precursors whose chemical formula is $M_1(OR_1)_n$,
precursors whose chemical formula is $M_2(OR_2)(OR_2)_{(n-1)} R_2'$,
precursors whose chemical formula is $M_3(OR_3)(OR_2)_{(n-2)} R_3'_2$,
$R_1$, $R_2$, $R_3$ or $R_3'$ being an alkyl group,
$R_2'$ designating an alkyl or phenyl group,
n being an integer corresponding to the maximal valence of metals $M_1$, $M_2$, or $M_3$,
$M_1$, $M_2$, or $M_3$ designating a metal selected among Si, Zr, Ti, Sn, Al, Ce, V, Nb, Hf, Mg or Ln, Advantageously, the metal alkoxide of solution B is an alkoxysilane.

As alkoxysilanes which may be used in solution B of the method of the invention, methyltrimethoxysilane (MTMS), tetraethoxysilane (TEOS), methyltriethoxysilane (MTES), dimethyldimethoxysilane, and mixtures thereof may be cited.

Preferably, alkoxysilanes MTES and TEOS will be used as they do not contain methoxy groups. In this regard, the hydrolysis of methoxy leads to the formation of methanol in the sol-gel formulation, which, due to its rating as a toxic element, requires additional precautions during application. On the contrary, the hydrolysis of ethoxy groups generates only ethanol having a more favorable rating and hence, less restricting usage prescriptions with regard to the sol-gel coating.

According to an advantageous embodiment of the method of the invention, solution B may comprise a mixture of an alkoxylane such as defined above as well as an aluminum alkoxide.

The metal alkoxide type precursor of solution B is a mixture of a mineral, organic Lewis acid representing 0.01 to 10% by weight of the total weight of solution B.

As acids which may be used for mixing with the metal oxide precursor, acetic acid, citric acid, ethyl aceto-acetate, hydrochloric acid or formic acid may particularly be cited.

Preferred acids of embodiments of the invention are organic acids, and more particularly, acetic acid and formic acid.

After preparing aqueous composition A and that of precursor solution B, they are mixed together, in order to form a sol-gel composition (A+B). The respective amounts of each of compositions A and B should be adjusted such that the amount of colloidal silica in the sol-gel composition represents 5 to 30% by dry weight.

The sol-gel composition (A+B) of embodiments of the invention may be applied over the substrate through spraying or through any other application mode, such as by soaking, stamping, with a paintbrush, with a roller, by spin-coating or serigraphy. Nevertheless, in the frame of a shaped object, for example, gun spraying has the advantage of forming a continuous, homogenous film which forms, after curing, a continuous coating whose thickness is smooth and tight.

Generally, after applying the sol-gel composition (A+B) according to embodiments of the invention, drying is carried out preferably at a temperature of 60° C. for a period of 1 minute.

The nature of the non stick coating changes according to the curing temperature, from an organo-mineral coating, for a curing temperature of about 200° C. to a substantially mineral coating for higher curing temperatures.

At a curing temperature lower than 400° C., particularly between 180 and 350° C., the non stick coating is an organo-mineral coating (unless the precursor is solely a TEOS, in this case, a substantially mineral coating would be produced, even in the case of curing temperatures lower than 400° C.).

Advantageously, a hollow cap, such as described previously, with a bottom and a lateral wall rising from the bottom should be used as the substrate to be used to prepare the cooking item according to embodiments of the invention.

The substrate to be used in the frame of the present invention will advantageously be made from a material selected from metals, glass, and ceramics.

Advantageously, anodized or non anodized, aluminum or aluminum alloy substrates, stainless steel, cast iron, iron or copper substrates may be cited as the metal substrates which may be used in embodiments of the method of the invention.

The method according to embodiments of the invention may further comprise a step of depositing an enamel layer on the side opposite to that coated with a non stick coating according to the invention, this enamel layer deposition step being carried out prior to the non stick coating step according to embodiments of the invention.

Besides the aforementioned advantages, the implementation of the method in accordance with embodiments of the invention is particularly simple, and this method may be considered without introducing important modifications to usual manufacturing processes of cooking item cooking items.

Other advantages and features of the present invention will become more apparent from the following description, given only by way of non limitative example and made with reference to the accompanying drawings.

BRIEF DESCRIPTION OF THE DRAWINGS

FIG. 3 represents a cross-sectional schematic view of a cooking item in accordance with the invention according to a first alternative embodiment (smooth substrate);

FIG. 4 represents a cross-sectional schematic view of a cooking item in accordance with the invention according to a second alternative embodiment (sand blasted substrate);

FIGS. 5, 7, 9, 11, 13 and 15 are views of the substrate obtained when the impact is made on the internal side with the non stick coating (internal drawing test), whereas FIGS. 6, 8, 10, 12 and 14 are views of the substrate when the impact is made on the side opposite to that provided with the non stick coating (exterior drawing test);

DETAILED DESCRIPTION

Figure 1:
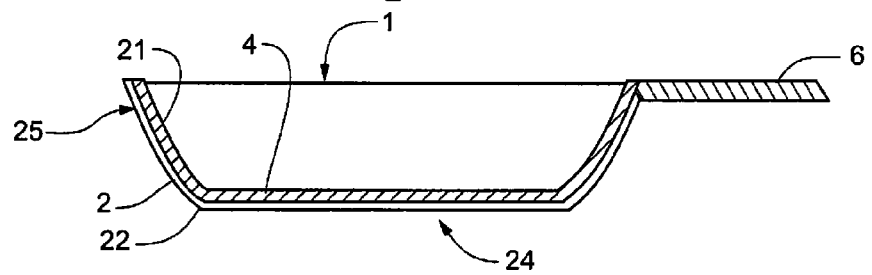
FIG. 1 represents a cross-sectional schematic view of a cooking item having a smooth internal side coated with a sol-gel type, vitreous, non-stick coating.

The identical elements represented on FIGS. 1 to 4 are denoted by identical numerical references.

FIGS. 1 to 4 represent, as a cooking item, a frying pan 1 comprising a substrate 2 having a hollow cap shape with a bottom 24 and a lateral wall 25 rising from the bottom 34, as well as a grip handle 6. The substrate 2 comprises an internal side 21 which may accommodate food items, and an exterior side 22 to be arranged on the heat source side, such as a cooking plate or a burner.

FIG. 1 particularly shows a cooking item whose smooth, substrate internal side 21 is coated with a sol-gel type, vitreous, non stick coating 4 in accordance with that of the present invention.

Figure 2:
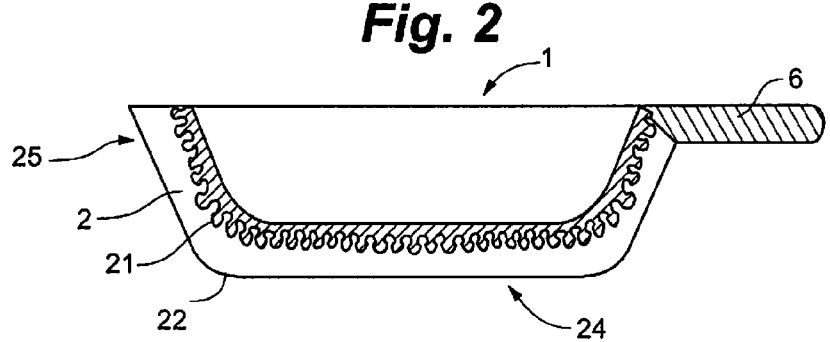
FIG. 2 represents a cross-sectional schematic view of a cooking item having a sand blasted internal side coated with a sol-gel tpe vitreous, non-stick coating.

FIG. 2 shows a cooking item whose internal side 21 has been degreased and then sand blasted and exhibits a surface roughness Ra between 3 µm and 8 µm. This sand blasted internal side 21 is also coated with a sol-gel type vitreous, non stick coating 4 in accordance with the present invention.

FIGS. 3 and 4 show two alternative embodiments of a cooking item conform to the invention. With respect to these two alternative embodiments, the internal side 21 is successively coated from substrate 2, with an enamel hard base layer 3 in accordance with the present invention and with a vitreous, non stick coating 4, also in accordance with the present invention.

According to the alternative embodiment represented on FIG. 3, the internal side 21 is smooth. In this case, the surface roughness Ra of the hard base layer 3 is comprised between 2 µm and 4 µm.

According to the alternative embodiment represented on FIG. 4, the internal side 21 has been degreased and sand blasted beforehand so as to obtain a surface roughness Ra comprised between 3 and 8 µm. In this case, the surface roughness Ra of the hard base layer 3 is comprised between 9 and 12 µm.

With respect to both alternative embodiments of the cooking item according to the invention and represented on FIGS. 3 and 4, the hard layer base 3 is a discontinuous enamel layer comprising a superficial dispersion of solidified enamel drops 31, having an average size between 2 µm and 50 µm and homogeneously distributed on the surface of internal side 21, with a surface coverage rate of the internal side between 40 and 80%, and a surface density comprised between 300 drops/mm$^2$ and 2000 drops/mm$^2$.

With respect to both alternative embodiments, enamel drops 31 dispersed on the internal side 21 surface are bedded in the non stick coating layer 4, so as to cause the non stick coating 4 to stick to the enamel hard base layer 3. Such an enameled hard base layer 3 in the form of a superficial dispersion of enamel drops makes it possible to significantly enhance the adherence of the non stick coating 4 over the substrate 2, and in particular, the impact resistance.

Hereafter, two embodiments of a cooking item 1 in accordance with the invention according to the first or second alternative embodiment as represented on FIGS. 3 and 4 respectively. The methods for producing the cooking items include embodiments comprising the following successive steps:

a) providing a substrate 2, exhibiting the final form of the cooking item with an internal side 21 to be disposed on the side of food items which would be introduced in said item 1, and an exterior side to be disposed on a heat source side;

c) preparing a hard base layer 3 over the internal side 21 of the substrate 2; then d) preparing a non stick coating 4 on the hard base layer 3 formed in step c) through a sol-gel treatment according to embodiments of the invention.

With respect to the first embodiment, step c) of preparing a hard base layer 3 is directly carried out over the internal side 21 of the substrate, without this side being chemically or mechanically prepared beforehand (smooth internal side 21).

Meanwhile, the second embodiment of the cooking item according to the invention further comprises, between steps a) of providing the substrate and c) of preparing a hard base layer over the internal side of the substrate, a step b) of preparing the surface of the internal side 21 comprising degreasing said surface followed by a mechanical treating such as sand blasting or brushing.

With respect to both such embodiments of the invention, step c) of preparing the hard base layer 3 comprises the following successive steps of:

c1) preparing an aqueous slurry of enamel frit, said enamel frit having less than 50 ppm of cadmium, and comprising 30 to 40% by weight of silica and 15 to 30% by weight of titanium oxide, less than 10% by weight of vanadium oxide and less than 4% by weight of lithium oxide with respect to the total weight of the frit, the aqueous slurry comprising less than 20% by weight of mineral fillers with respect to the total weight of the slurry, c2) applying, through air spraying, the slurry over the internal side 21 of substrate 2 with a spraying pressure higher than or equal to 4 bars and an amount of enamel deposition over said internal side 21 comprised between 0.07 g/dm$^2$ and 0.2 g/dm$^2$ (in this case, an amount of enamel slurry of 0.8 for a frying pan whereof the bottom has a diameter of 26 cm); then drying;

c3) drying (at a temperature between 120° C. and 200° C.) and/or curing said enamel layer 3 (at a temperature between 540 and 580° C. for at least 5 to 7 minutes, preferably, of about 550° C.), the drying and/or curing being carried out before the preparation of the non stick coating 4 of said enamel layer 3.

Advantageously, the enamel frit comprises:
$Al_2O_3$: less than 1%;
$B_2O_3$: less than 1%;
BaO: less than 1%;
$K_2O$: from 5 to 20%;
$Li_2O$: less than 4%;
$Na_2O$: from 10 to 25%;
$P_2O_5$: less than 4%;
$SiO_2$: from 30 to 40%;
$TiO_2$: from 15 to 30%;
$V_2O_5$: less than 10%;

The indicated contents are weight percents with respect to the total weight of the frit.

Advantageously, the enamel frit slurry further comprises:
quartz: from 5 to 30%;
SiC: from 10 to 30%;
Pigment: from 1 to 10%;
Suspension agent: from 2 to 10%;

The indicated contents are weight percentages with respect to the total weight of the slurry.

The following examples illustrate the invention without limiting its scope.

In the examples, unless otherwise specified, all the amounts are given in grams.

EXAMPLES

Products

Enamel Frit:
$Al_2O_3$
$B_2O_3$
$B_4O$
$K_2O$
$Li_2O$
$Na_2O$
$P_2O_5$
$SiO_2$
$TiO_2$
$V_2O_5$ Sol-Gel Coating (A+B):

Aqueous Composition A:

Colloidal metal oxide: colloidal silica in the form of an aqueous solution with 30% of silica, from Clariant under trade name Klebosol.

Solvent: isopropanol

Silicone oil: food-grade methylsilicone oil from TEGO under trade name "TEGO ZV 9207".

Pigment: mineral black pigment from Ferro under trade name "FA 1260".

Solution B:

Precursors:

methyltriethoxylsilane (MTES) of formula $Si(OCH_2CH_3)_3CH_3$, methyltriethoxylsilane (MTMS) of formula $Si(OCH_3)_3CH_3$, Acid: acetic acid Test Impact Resistance of the Non Stick Coating Assessed by Means of the Erichsen Test in Accordance with ISO Standard 6272.

The test is an impact testing through which a 2-kg ball is dropped from a height of 50 cm. For the sake of testing, aluminum pads, of which one side is coated with a sol-gel type non-stick coating in accordance with the invention, are used. All the pads are identical to each other (in terms of thickness and alloy nature) so as to obtain a constant strain for all the tests.

This test comprises performing an impact directly on the non-stick coating deposited on the coated side of a pad (interior drawing test) and an impact on the side opposite to that coated with a non stick coating of another pad (exterior drawing test).

After the impacts have been performed, a visual examination of the coated side of the non stick coating is carried out.

Figure 5:
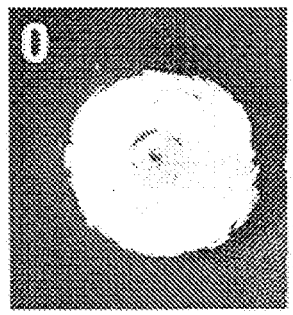
FIGS. 5 to 15 represent successive top views of a metal substrate coated with a non stick coating after impact resistance tests of the non stick coating in accordance with the Erichsen test conforming to ISO standard 6272 aimed to constitute a visual scale for the assessment of the impact resistance.
Figure 6:
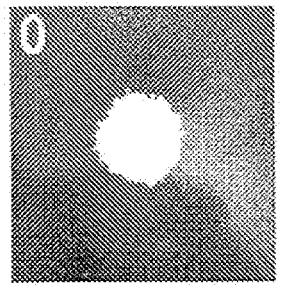
Figure 7:
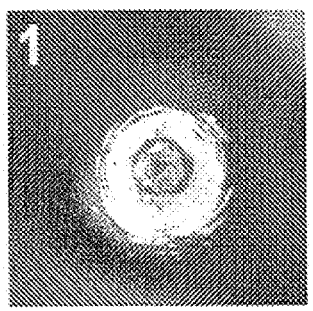
Figure 8:
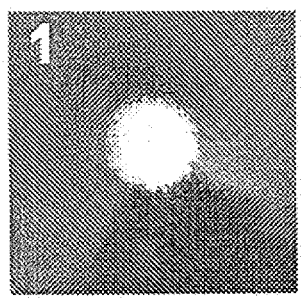
Figure 9:
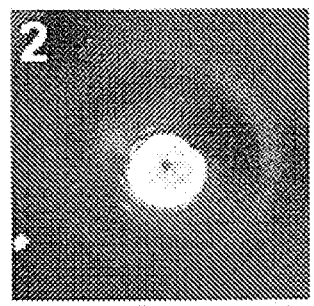
Figure 10:
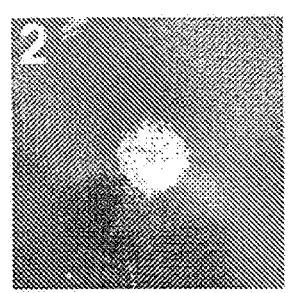
Figure 11:
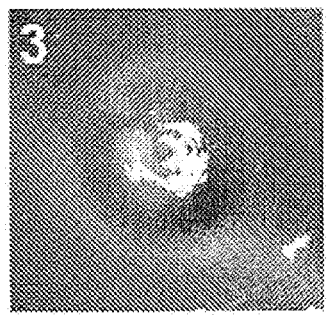
Figure 12:
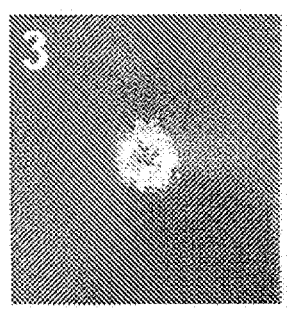
Figure 13:
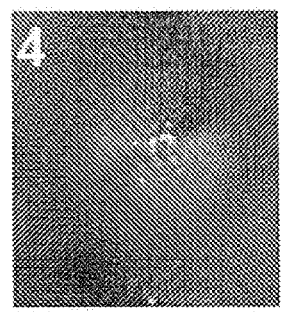
Figure 14:
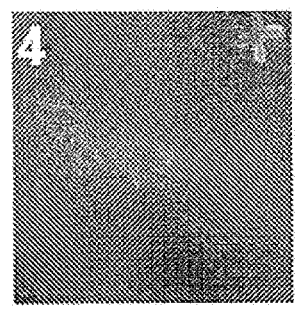
Figure 15:
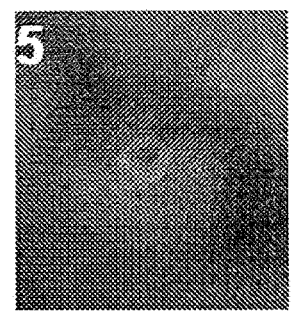

The impact resistance of the non stick coating is assessed on the basis on the following visual scale, which is established after a direct impact on the non stick coating, on one hand (internal drawing test), and on the side opposite to the coated side of the non stick coating (exterior drawing test) on the other hand:

rank 0 is given if the following observation is made:
with regard to the interior drawing test:
at the impact, a full delamination of the non stick coating over the entire deformed surface of the internal side which is expressed by the appearance of a "white" area at the impact (corresponding to a coating-free metal surface portion), shaped as a disk whose diameter is of about 25 mm, such as illustrated in FIG. 5;
with regard to the exterior drawing test:
also, a complete delamination of the non stick coating over a large surface of the deformed internal side, which is expressed by the appearance of a "white" area at the impact (corresponding to a coating-free metal surface portion), this area being shaped as a disk of at least 10 mm in diameter, such as illustrated in FIG. 6;

rank 1 is given if the following is observed:
with regard to the interior drawing test:
at the impact, an almost complete delamination of the non stick coating over a large surface of the deformed internal side, this deformation being expressed by the appearance of a quasi "white" area at the impact (corresponding to a coating-free metal surface portion), this area being shaped as a disk whose diameter is of about 20 mm as illustrated on FIG. 7;
with regard to the exterior drawing test:
a quasi-complete delamination of the non stick coating over an average surface of the deformed internal side, which is expressed by the appearance of a "white" area with no coating at the impact, shaped as a disk having a diameter of about 10 mm, such as illustrated on FIG. 8;

rank 2 is given is the following is observed:
with regard to the interior drawing test:
at the impact, an almost complete delamination of the non stick coating over an average surface of the coated internal side, which is expressed by the appearance of a "white", coating-free, area at the impact, being shaped as a disk whose diameter is of about 10 mm as illustrated on FIG. 9;
with regard to the exterior drawing test:
at the impact, a white area shaped as a disk having a diameter less than 10 mm, wherein large slivers reaching the substrate metal surface are located, with a relatively high sliver density, such as illustrated on FIG. 10;

rank 3 is given if the following is observed:
with regard to the interior drawing test:
at the impact, a central area in which are located large slivers exposing the metal, such as illustrated on FIG. 11;
with regard to the exterior drawing test:
at the impact, a white area shaped as a disk having a diameter less than 10 mm, and in which small slivers reaching the metal are located, with a fairly high density, such as illustrated on FIG. 12;

rank 4 is given if the following is observed:
with regard to the interior drawing test:
at the impact, an area shaped as a disk having a small diameter, wherein fine slivers reaching the metal are located, with a rather low density, such as illustrated on FIG. 13;
with regard to the exterior drawing test:
several pin holes reaching the metal, located at the impact, such as illustrated on FIG. 14;
and finally, rank 5 is given if the following is observed:
with regard to the interior drawing test:
at the impact, a small halation, lighter than the non stick coating, such as illustrated on FIG. 15;
with regard to the exterior drawing test:
no modifications of the aspect of the non stick coating (non illustrated in the visual scale used in the present application).

Example 1

Preparation of an Enamel Frit F in Accordance with the Enamel Frit Used in a Method in Accordance with an Embodiment of the Invention An enamel frit F in accordance with the enamel frit used in a method in accordance with an embodiment of the invention has been prepared by melting the following components:
$Al_2O_3$: 0.1%;
$B_2O_3$: 0.6%;
BaO: 0.3%;
$K_2O$: 12%;
$Li_2O$: 2.3%;
$Na_2O$: 19%;
$P_2O_5$: 1.6%;
$SiO_2$: 35%;
$TiO_2$: 23.5%;
$V_2O_5$: 5.2%;
Then, the melted mixture obtained is grinded to yield a powdery frit F whose mean particle size is of 15 µm and a linear expansion coefficient of $494 \times 10^{-7}$ m·K$^{-1}$.

Example 2

Preparation of an Example of Enamel Frit Slurry B', in Accordance with the Enamel Frit Used in Method in Accordance with an Embodiment of the Invention The enamel frit F has the form of a slurry B, by mixing the following components (parts by weight):
Enamel frit F: 70;
Water: 55;
Quartz: 25;
SiC: 23;
Fe and Mn oxide based black pigment: 5.
Boric acid: 4
Thus obtained slurry B' exhibits a density of 1.70 g/cm³ and a "set-up" of 1300 g/m².
Here, the meaning of "set-up" is the amount of matter required to uniformly cover a given surface after application.

Example 3

Preparing a Composition of Non Stick Coating R in Accordance with an Embodiment of the Present Invention In view of preparing a composition of non stick coating R in accordance with the invention, the following is carried out:
3.1) preparing a colloidal silica based aqueous composition in accordance with a method pursuant to an embodiment of the invention;
3.2) and 3.3) preparing a MTES or MTMS based solution B, in accordance with the embodiment;
3.4) and 3.5) performing, from aqueous solution A and solution B, a sol-gel composition (A+B), in accordance with a method pursuant to an embodiment of the invention.

3.1 Preparation of a Colloidal Silica Based Aqueous Composition A

A colloidal silica based aqueous composition A, presented in table 1, has been performed.

TABLE 1

| Components of portion A | Amount (g) |
|---|---|
| Aqueous solution with 30% colloidal silica: Klebosol | 42 |
| Water | 16 |
| Isopropanol | 8 |
| Black pigment FA 1220 | 33 |
| Silicone oil TEGO ZV 9207 | 1 |
| Total | 100 |

3.2 Preparation of an MTES Based Solution B

A solution B is prepared by mixing 59.4 g of MTES with 2.4 g of acetic acid, yielding a solution of 4% by weight of acid in the MTES.

3.3 Preparation of an MTMS Based Solution B According to an Embodiment of the Invention A solution B is prepared by mixing 59.4 g of MTMS with 0.6 g of acetic acid, yielding a solution of 1% by weight of acid in the MTMS.

3.4 Preparation of a First Example of Sol-Gel (SG) Composition According to an Embodiment the Invention (from MTES)

A first sol-gel SG composition according to an embodiment of the invention is made by adding, to 100 g of aqueous solution A according to an embodiment of the invention, 61.8 g of solution B of example 1.2. Mixing in a planetary mixer for one hour at a temperature lower than 60° C. yields a sol-gel composition according to an embodiment of the invention SG which is kept at room temperature. The SG composition is left to mature for 24 hours at room temperature after mixing, before application over a substrate.

3.5 Preparation of a Second Example of Sol-Gel (SG) Composition According to an Embodiment of the Invention (from MTMS)

A first sol-gel SG composition according to an embodiment of the invention is made by adding, to 100 g of aqueous solution A according to an embodiment of the invention, 60 g of solution B of example 1.3. Mixing in a planetary mixer for one hour at a temperature lower than 60° C. yields a sol-gel composition according to an embodiment of the invention SG which is kept at room temperature. The SG composition is left to mature for 24 hours at room temperature after mixing, before application over a substrate.

Example 4

Preparing a First Example of a Cooking Item According to an Embodiment of the Invention Sand Blasted Substrate+Discontinuous Enameled Hard Base Layer As the substrate, an aluminum cap obtained by forming an aluminum disc (1200 type), the accordingly obtained cap having a bottom whose diameter is of about 26 cm.

This cap is degreased by spraying an alkaline solution, and the bottom internal side of the cap is sand blasted (using corundum) yielding a surface roughness between 2 and 4 µm.

Then, on the sand blasted internal side, slurry B' is applied b means of an air gun, so as to form a discontinuous layer shaped as disconnected droplets. The cap accordingly coated is dried at a temperature of 140° C., then vitrified at 555° C. for 5 minutes, so as to obtain a discontinuous hard which thickness is of 50 µm. Roughness Ra of this continuous hard base layer is comprised between 9 µm and 12 µm.

Following cooling of this hard base layer, non stick coating R is carried out by applying the sol-gel composition SG of example 3.4 (obtained from a MTES based solution B) over the discontinuous enameled hard base layer 3, according to the following cycle:

applying a sol-gel composition layer SG of example 3 over the substrate, to a wet thickness of 40 to 70 microns, drying for 1 minute at 60° C., and cooling at room temperature.

It is possible to apply this cycle several times, the number of cycles being determined by the desired final thickness.

At the end of the application/drying cycle or cycles, curing is carried out for 15 minutes at 270° C. Thus, a cooking item having a non stick coating exhibiting a thickness comprised between about 35 microns (±5 µm) and which is smooth, black and glossy is obtained.

The cooking item of example 4 according to an embodiment of the invention is shown on FIG. 4.

Example 5

Preparation of a Second Example of a Cooking Item According to an Embodiment of the Invention Sand Blasted Substrate+Discontinuous Enameled Hard Base Layer The same as for example 4 is carried out except that sol-gel composition SG of example 3.5 is used (obtained from a MTMS based solution B).

Cooking item of example 5 is also shown on FIG. 4.

Example 6

Preparing a Third Example of a Cooking Item According to an Embodiment of the Invention Smooth Substrate+Discontinuous Enameled Hard Base Layer As the substrate, the same substrate as example 4 is used except that internal side 21 of substrate 2 is not subjected to a mechanical treatment and remains smooth.

Meanwhile, with regard to the preparation of the enamel layer 3, the same as for example 4 is carried out.

With regard to the preparation of the sol-gel coating SG over hard base layer 3, the same as for example 4 is carried out, using sol-gel composition SG of example 3.4 (obtained from an MTMS based solution B).

Cooking item of example 6 is shown on FIG. 3.

Example 7

Preparation of a Second Example of a Cooking Item According to an Embodiment of the Invention Sand Blasted Substrate+Discontinuous Enameled Hard Base Layer The same as for example 6 is carried out except that sol-gel composition SG of example 3.5 is used (obtained from a MTMS based solution B).

Cooking item of example 7 is also shown on FIG. 3.

Example 8

Preparation of a First Example of a Reference Cooking Item

Sand Blasted Substrate but No Hard Base Layer

As the substrate 2, the same substrate as for example 4 is used (sand blasted substrate).

In this example, no discontinuous enameled hard base layer is performed over internal side 21 of substrate 2. Consequently, the non stick coating 4 is directly made over the substrate internal side 21, sand blasted then degreased beforehand, proceeding in the same manner as for example 4, that is, using the MTES based sol gel coating of example 3.4.

The cooking item of example 8 is shown on FIG. 2.

Example 9

Preparation of a Second Example of a Reference Cooking Item

Sand Blasted Substrate but No Hard Base Layer

The same as for example 8 is carried out except that sol-gel composition SG of example 3.5 is used (obtained from a MTMS based solution B).

Cooking item of example 9 is shown on FIG. 2.

Example 10

Preparation of a Third Example of a Reference Cooking Item

Smooth Substrate but No Hard Base Layer

As the substrate 2, the same substrate as for example 6 is used (smooth substrate). Then, the non stick coating 4 is made directly over the internal side 21 of substrate 2 which remained smooth, in a manner identical to example 8 (MTES based sol-gel coating of example 3.4). 7

Cooking item of example 10 is represented on FIG. 1.

Example 11

Preparation of a Third Example of a Reference Cooking Item

Smooth Substrate but No Hard Base Layer

The same as for example 10 is carried out except that sol-gel composition SG of example 3.5 is used (obtained from a MTMS based solution B).

Cooking item of example 11 is shown on FIG. 1.

Example 12

Erichsen Test

The impact resistance is assessed according to the Erichsen test by subjecting reference cooking items of examples 8 to 11 (shown on FIGS. 2 and 1 respectively) and cooking items of examples 4 to 7 (respectively shown on FIGS. 4 and 3) according to embodiments of the invention.

The Erichsen tests results obtained from frying pans, according to the invention, from examples 4 and 5 (sand blasted substrate, FIG. 4), and 6 and 7 (smooth substrate, FIG. 3), on the one hand, and reference frying pans of examples 8 and 9 (sand blasted substrate, FIG. 2), and 10 and 11 (smooth substrate, FIG. 1) on the other hand, are visual observations translated into a ranking varying from 0 to 5 according to the visual scale indicated above and illustrated by FIGS. 5 to 15, which are all of the same scale. These results are presented in table 2 below.

TABLE 2

| | Erichsen Test results: ranking according to the visual scale (1-5) | |
|---|---|---|
| | Interior drawing | Exterior drawing |
| Cooking item according to an embodiment of the invention with sand blasted substrate (MTES, ex. 4, FIG. 4) | 3 | 4 |
| Cooking item according to an embodiment of the invention with sand blasted substrate (MTMS, ex. 5, FIG. 4) | 3 | 4 |
| Cooking item according to an embodiment of the invention with smooth substrate (MTES, ex. 6, FIG. 3) | 1 | 4 |
| Cooking item according to an embodiment of the invention with smooth substrate (MTES, ex. 7, FIG. 3) | 1 | 4 |
| Cooking item according to an embodiment of the invention with sand blasted substrate (MTES, ex. 8, FIG. 2 and 16) | 2 | 2 |
| Cooking item according to an embodiment of the invention with sand blasted substrate (MTMS, ex. 9, FIG. 2 and 16) | 2 | 2 |
| Cooking item according to an embodiment of the invention with smooth substrate (MTES, ex. 10, FIG. 1) | 0 | 0 |
| Cooking item according to an embodiment of the invention with smooth substrate (MTMS, ex. 11, FIG. 1) | 0 | 0 |

Figure 16:
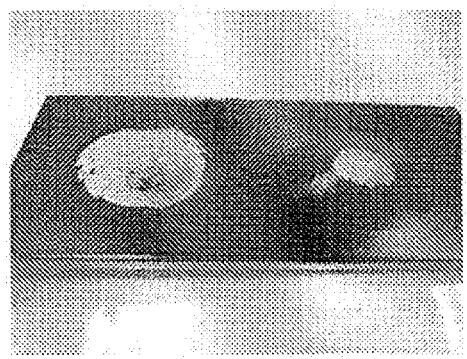
FIG. 16 represents a top view of the cooking item of FIG. 2 following the Erichsen test.

FIG. 16 represents (on the same figure) the state of the non stick coating after subjecting a sand blasted metal substrate comprising a non stick coating 4 with no hard base layer 3 to an internal drawing test (left part on FIG. 16) on the one hand, and after an exterior drawing test (right part of FIG. 16) on the other hand.

FIG. 16 corresponds to FIGS. 9 and 10 of visual scale (ranking 2).

Figure 17:
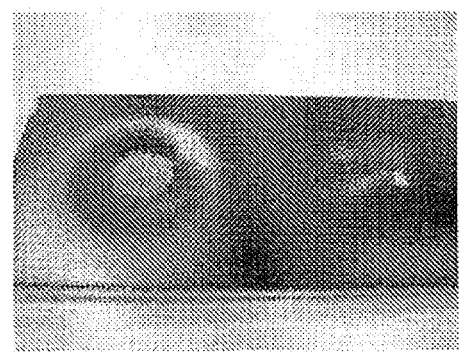
FIG. 17 represents a top view of the cooking item of FIG. 4 following the Erichsen test.

FIG. 17 represents (on the same figure) the state of the non stick coating after subjecting a sand blasted metal substrate successively covered with a hard base layer 3 then a non stick coating 4 in accordance with an embodiment of the present invention, to an internal drawing test (left part on FIG. 17) on one hand, and after an exterior drawing test (right part of FIG. 16) on the other hand.

The results presented in table 2 and illustrated on FIGS. 16 and 17 show that the formation of an enameled hard base layer over the internal side surface makes it possible to improve the adhesion properties of a sol-gel type non stick coating to a substrate.

Prior sand blasting further reinforces the adhesion properties to the substrate. Nevertheless, only sand blasting the substrate (without a hard base layer in accordance with the invention) does not provide satisfactory results in terms of adhesion to the substrate.

The invention claimed is:

1. A method for producing a cooking item, the method comprising:
   a) providing a substrate having an end shape of the cooking item, the end shape presenting a concave internal side configured to contain a food item introduced into said cooking item, and a convex exterior side configured to be positioned proximate a heat source;
   b) optionally, treating the internal side of the substrate, so as to obtain a treated internal side adapted to cause a hard base layer to adhere to the substrate;
   c) preparing a discontinuous enameled adhering base layer on said internal side of the substrate, be it treated beforehand or not; and
   d) preparing a non stick PTFE-free coating on said hard base layer formed in step c);
   wherein step c) of preparing a discontinuous, enameled hard base layer comprises successively—
   c1) preparing an aqueous slurry of enamel frit,
   c2) applying, through air spraying, the slurry on the internal side of the substrate with a pressure equal to or higher than 4 bars such that the amount of deposited slurry is comprised between 0.07 $g/dm^2$ and 0.2 $g/dm^2$, and then
   c3) drying and/or curing said enamel layer so as to form a hard biscuit of enamel or a layer of cured enamel, and
   wherein step d) of preparing the non stick PTFE-free coating on said enamel hard biscuit or said cured enamel layer comprises successively—
   d1) preparing a sol-gel composition (A+B) comprising at least a colloidal metal oxide and at least a metal oxide precursor, wherein the preparation of the sol-gel composition (A+B) comprises successively:
   i) preparing an aqueous composition A comprising 5 to 30% by weight with respect to a total weight of the aqueous composition A of at least one colloidal metal oxide, and 0 to 20% by weight with respect to a total weight of composition A of a solvent comprising at least one alcohol;
   ii) preparing a solution B comprising at least a metal alkoxide as the at least one metal oxide precursor;
   iii) mixing solution B of metal alkoxide with aqueous solution A so as to obtain a sol-gel composition (A+B) containing 40 to 75% by weight of the aqueous composition A with respect to a total weight of the sol-gel composition (A+B), so that an amount of colloidal metal oxide represents 5 to 30% by weight of the sol-gel composition (A+B) on a dry basis;
   d2) applying over an entirety or over a portion of the enamel hard biscuit or said cured enamel layer at least a layer of the sol-gel composition (A+B) having a wet-basis thickness of at least 20 µm, and then
   d3) curing said sol-gel composition layer (A+B) so as to obtain a non stick PTFE-free vitreous coating having a thickness of at least 10 µm.

2. The method according to claim 1, wherein:
said enamel frit comprises 30 to 40% by weight of silica and 15 to 30% by weight of titanium oxide, less than 10% by weight of vanadium oxide and less than 4% by weight of lithium oxide with respect to a total weight of the enamel frit, and
the aqueous slurry comprises at least 20% by weight of mineral fillers with respect to a total weight of the aqueous slurry.

3. The method according to claim 1, wherein the colloidal metal oxide is selected from the group consisting of silica, alumina, cerium oxide, zinc oxide, vanadium oxide, zirconium oxide, and combinations thereof.

4. The method according to claim 1, wherein the aqueous composition A further comprises at least one silicone oil.

5. The method according to claim 1, wherein the metal alkoxide of solution B is selected from the group consisting of:
precursors having a chemical formula of $M_1(OR_1)_n$,
precursors having a chemical formula of $M_2(OR_2)_{(n-1)}R_2'$,
precursors having a chemical formula of $M_3(OR_3)_{(n-2)}R_3'_2$,
with:
$R_1, R_2, R_3$ or $R_3'$ being an alkyl group,
$R_2'$ designating an alkyl or phenyl group,
n being an integer corresponding to a maximal valence of metals $M_1, M_2,$ or $M_3$,
$M_1, M_2,$ or $M_3$ designating a metal selected from among Si, Zr, Ti, Sn, Al, Ce, V, Nb, Hf, Mg or Ln.

6. The method according to claim 5, wherein the metal alkoxide is an alkoxysilane selected from methyltriethoxysilane (MTES) and tetraethoxysilane (TEOS).

7. The method according to claim 1, wherein step b) of treating the internal side of substrate comprises a step of performing a sand blasting type mechanical treatment.

8. The method according to claim 1, wherein during step c) of preparing a discontinuous, enameled hard base layer, the non cured enamel layer is dried at a temperature between 120 and 200° C., so as to obtain an enameled biscuit.

9. The method according to claim 1, wherein during step c) of preparing a discontinuous, enameled hard base layer, the non cured enamel layer is subjected to a curing at a temperature between 500° C. and 580° C.

* * * * *